United States Patent
Krah et al.

(10) Patent No.: US 9,746,967 B2
(45) Date of Patent: Aug. 29, 2017

(54) CONCURRENT TOUCH AND NEGATIVE PIXEL SCAN

(75) Inventors: Christoph Horst Krah, Los Altos, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1515 days.

(21) Appl. No.: 13/234,095

(22) Filed: Sep. 15, 2011

(65) Prior Publication Data
US 2013/0069905 A1   Mar. 21, 2013

(51) Int. Cl.
G06F 3/044   (2006.01)
G06F 3/041   (2006.01)

(52) U.S. Cl.
CPC .......... G06F 3/044 (2013.01); G06F 3/0418 (2013.01)

(58) Field of Classification Search
CPC ................. G06F 3/0418; G06F 3/044; G06F 2203/04104
USPC ......... 345/173–179; 178/18.01–18.11, 19.01
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2006/0026521 A1 | 2/2006 | Hotelling et al. | |
| 2006/0197753 A1 | 9/2006 | Hotelling | |
| 2009/0009483 A1* | 1/2009 | Hotelling et al. | ............ 345/173 |
| 2009/0250268 A1* | 10/2009 | Staton et al. | ............ 178/18.06 |
| 2010/0060590 A1 | 3/2010 | Wilson et al. | |

(Continued)

FOREIGN PATENT DOCUMENTS

JP   2000-163031 A   6/2000
JP   2002-342033 A   11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kent Chang
*Assistant Examiner* — Scott Au
(74) *Attorney, Agent, or Firm* — Morrison & Foerster, LLP

(57) ABSTRACT

A concurrent touch and negative pixel scan performed at a touch panel is disclosed. The concurrent scan can include sensing an object proximate to the touch panel and sensing a negative pixel effect, based the object's grounding condition, at the touch panel, at the same time. As a result, sense signals indicative of the proximity of the object and coupling signals indicative of the negative pixel effect's magnitude can be captured concurrently. Because the negative pixel effect can cause errors or distortions in the sense signals, the coupling signals can be used to compensate the sense signals for the negative pixel effect.

12 Claims, 10 Drawing Sheets

(56) References Cited

U.S. PATENT DOCUMENTS

| | | |
|---|---|---|
| 2010/0060593 A1 | 3/2010 | Krah |
| 2010/0060608 A1* | 3/2010 | Yousefpor .................. 345/174 |
| 2010/0073301 A1* | 3/2010 | Yousefpor et al. .......... 345/173 |
| 2010/0079401 A1 | 4/2010 | Staton |
| 2010/0079402 A1 | 4/2010 | Grunthaner et al. |
| 2010/0097343 A1* | 4/2010 | Fang .......................... 345/174 |
| 2011/0006832 A1 | 1/2011 | Land et al. |
| 2011/0061949 A1 | 3/2011 | Krah et al. |
| 2011/0102361 A1* | 5/2011 | Philipp ....................... 345/174 |
| 2011/0298734 A1* | 12/2011 | Ho et al. ..................... 345/173 |
| 2012/0105353 A1* | 5/2012 | Brosnan ................. G06F 3/044 |
| | | 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

CONCURRENT TOUCH AND NEGATIVE PIXEL SCAN

FIELD

This relates generally to touch panels and more particularly to concurrent scans of touch panels.

BACKGROUND

Many types of input devices are presently available for performing operations in a computing system, such as buttons or keys, mice, trackballs, joysticks, touch sensor panels, touch screens and the like. Touch sensitive devices in particular are popular because of their ease and versatility of operation as well as their declining price. A touch sensitive device can include a touch sensor panel, which can be a clear panel with a touch sensitive surface. In some instances, a touch sensitive device can also include a display device such as a liquid crystal display (LCD) that can be positioned partially or fully behind the panel or integrated with the panel so that the touch sensitive surface can cover at least a portion of the viewable area of the display device. The touch sensitive device can allow a user to perform various functions by touching or hovering over the touch sensor panel using a finger, stylus or other object at a location on the panel. In the instance of the display device, the touching or hovering location can often be dictated by a user interface (UI) being displayed by the display device. In general, the touch sensitive device can recognize a touch or hover event and the position of the event on the touch sensor panel. The computing system can then interpret the event and thereafter can perform one or more functions based thereon.

When the object touching or hovering over the touch sensor panel is poorly grounded, data outputs indicative of the touch or hover event can be erroneous or otherwise distorted. The possibility of such erroneous and distorted outputs can further increase when two or more simultaneous touch or hover events occur at the touch sensor panel.

Many touch sensitive devices are now recognizing simultaneous touch or hover events, in addition to single touch or hover events, as additional inputs to allow the user to perform various functions associated with the simultaneous events. As such, techniques to address poorly grounded objects that cause the simultaneous events are becoming quite important. The challenge is to develop a technique that appropriately addresses the erroneous of distorted outputs, yet does so in an efficient, effective manner.

SUMMARY

This relates to a concurrent touch and negative pixel scan performed at a touch panel of a touch sensitive device. The concurrent scan can include sensing an object proximate to the touch panel and sensing a negative pixel effect, based the object's grounding condition, on the touch panel, at the same time. As a result, sense signals indicative of the proximity of the object and coupling signals indicative of the negative pixel effect's magnitude can be captured concurrently. The negative pixel effect can cause errors or distortions in the sense signals, particularly when the sense signals indicate the proximate object touching or hovering over multiple touch panel locations. Accordingly, the coupling signals can be applied to the sense signals to compensate the sense signals for the negative pixel effect. In one example, a single concurrent scan can be performed at the touch panel during a scan period. In another example, multiple successive concurrent scans can be performed at the touch panel during a scan period. By performing the touch and negative pixel scan concurrently, rather than sequentially, the touch sensitive device can advantageously save processing time and power consumption, while improving touch and hover sensing, particularly for multiple simultaneous touch or hover events.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a concurrent touch and negative pixel scan performed at a touch panel of a touch sensitive device. The concurrent scan can include sensing an object proximate to the touch panel, i.e., the "touch" scan, and sensing a negative pixel effect, based the object's grounding condition, at the touch panel, i.e., the "negative pixel" scan, at the same time. As a result, sense signals indicative of the proximity of the object and coupling signals indicative of the negative pixel effect's magnitude can be captured concurrently. Because the negative pixel effect can cause errors or distortions in the sense signals, particularly when the sense signals indicate the proximate object touching or hovering over multiple touch panel locations, the coupling signals can be applied to the sense signals to compensate the sense signals for the negative pixel effect.

In some embodiments, a single concurrent scan can be performed at the touch panel during a scan period. In alternate embodiments, multiple successive concurrent scans can be performed at the touch panel during a scan period, where each scan can be performed with a different touch panel configuration.

In some embodiments, noise can be introduced into the touch panel by adjacent circuitry. Accordingly, the concurrent scan can further include sensing the introduced noise. The introduced noise can then be rejected from the touch panel while the sense signals and coupling signals are being processed.

Some present techniques perform the touch scan and the negative pixel scan separately, in sequence, either during a scan period or during successive scan periods. By performing the touch and negative pixel scan concurrently, according to various embodiments, the touch sensitive device can advantageously save processing time and power consumption, while improving touch and hover sensing, especially for multiple simultaneous touch or hover events.

Figure 1:
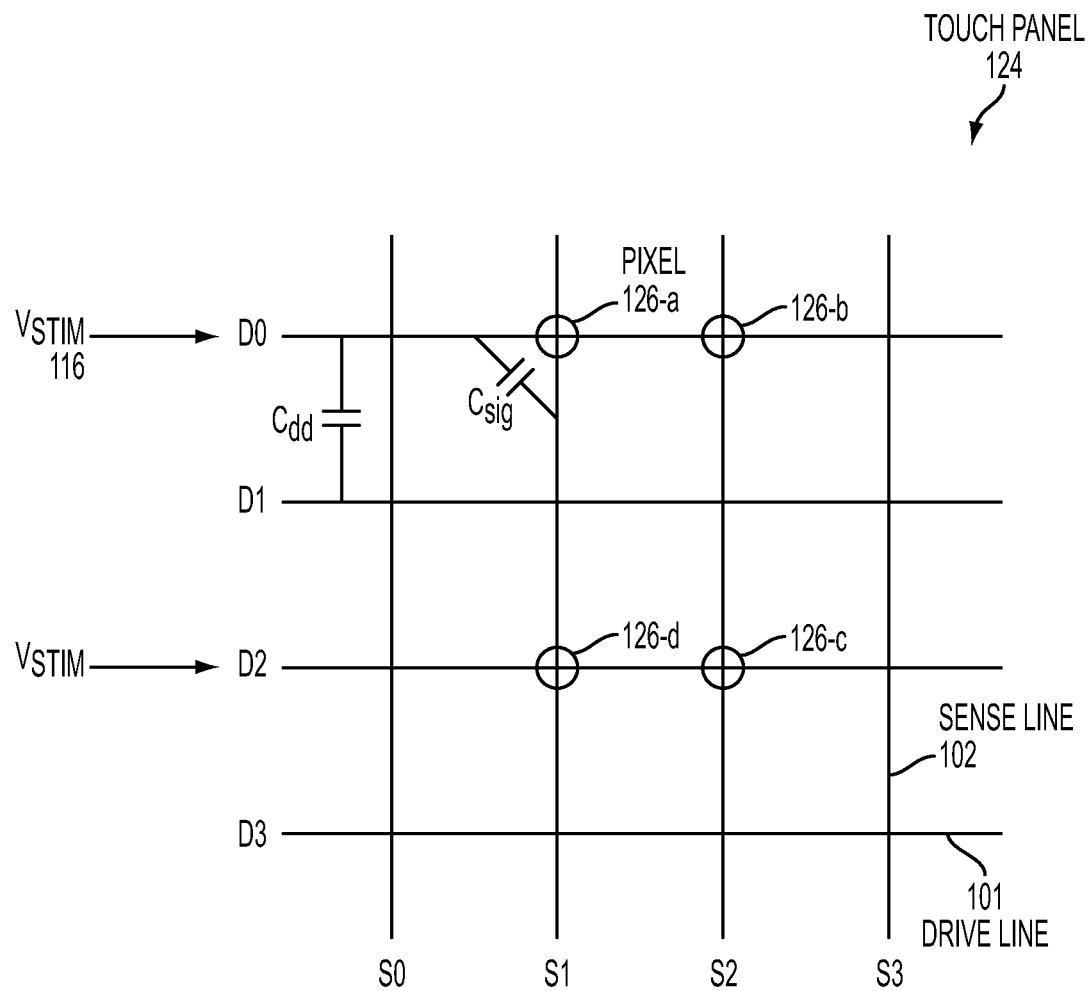
FIG. 1 illustrates an exemplary touch panel that can have a concurrent touch and negative pixel scan according to various embodiments.

FIG. 1 illustrates an exemplary touch panel that can have a concurrent touch and negative pixel scan according to various embodiments. In the example of FIG. 1, touch sensor panel 124 can include an array of pixels 126 that can be formed at the crossings of rows of drive lines 101 (D0-D3) and columns of sense lines 102 (S0-S3). The drive lines 101 can be used to drive the panel 124 with stimulation signals Vstim 116. The sense lines 102 can be used to transmit sense signals, in response to the stimulation signals 116, indicative of a touch or hover at the panel 124. Each pixel 126 can have an associated mutual capacitance Csig when the drive line 101 forming the pixel is stimulated with a stimulation signal 116.

When an object, e.g., a finger, touches or hovers over the panel 124 at the location of the stimulated pixel 126, the capacitance Csig can reduce by ΔCsig due to charge being shunted from the stimulated pixel through the touching or hovering object to ground. The reduced Csig can be transmitted by the associated sense lines 102 and captured during a panel scan for processing by sense circuitry (not shown). In this example, drive line D0 can be stimulated with the stimulation signal 116, forming a mutual capacitance Csig between the stimulated drive line D0 and the crossing sense lines S0-S3. When an object touches or hovers over the panel 124 at stimulated pixel 126-a formed by drive line D0 and sense line S1, the mutual capacitance Csig at pixel 126-a can be reduced by ΔCsig.

In some embodiments, multiple drive lines 101 can be concurrently stimulated with stimulation signals 116 to detect multiple objects, e.g., multiple fingers, touching or hovering over the panel 124. If the objects are properly grounded, multiple reduced Csig signals can be transmitted by the associated sense lines 202 and captured during a panel scan for processing by the sense circuitry.

However, if the objects are not properly grounded, they can capacitively couple with the panel 124, sending some of the charge from the stimulated pixels 126 back into the panel. As a result, instead of the capacitance Csig being reduced by ΔCsig at the pixels 126 where the touch or hover occurs, Csig can only be reduced by (ΔCsig−Cneg), where Cneg can represent a so-called "negative capacitance."

Accordingly, the Csig signals captured during the scan can be attenuated. In this example, drive lines D0, D2 can be stimulated with stimulation signals 116, forming a mutual capacitance Csig between the stimulated drive line D0 and the crossing sense lines S0-S3 and between the stimulation drive line D2 and the crossing sense lines S0-S3. When poorly grounded objects touch or hover over the panel 124 at stimulated pixels 126-a and 126-c formed by drive line D0 and sense line S1 and by drive line D2 and sense line S2, respectively, the mutual capacitance Csig at pixels 126-a and 126-c can only be reduced by (ΔCsig−Cneg), thereby attenuating the sense signals transmitted on sense lines S1, S2 and captured during the panel scan.

Not only can the pixels 126-a and 126-c where the touch or hover occurs be affected, but adjacent pixels 126-b and 126-d that are not being touched or hovered over can also be affected. Rather than experience no change in capacitance Csig, the adjacent pixels 126-b and 126-d can give the appearance of a so-called "negative pixel" or a theoretical negative amount of touch, i.e., an increase in Csig. This can be because the poorly grounded object can couple some of the charge from the stimulated pixel 126-a and 126-c back into the panel 124, which can cause an apparent increase in charge at pixel 126-b and an apparent increase in charge at pixel 126-d when the sense lines are scanned for touch activity. Accordingly, the Csig signals for the adjacent pixels 126-b and 126-d can have "negative pixel" values captured during the scan.

When the drive lines 101 are stimulated, they can capacitively cross-couple with other drive lines through the touching or hovering objects. In this example, stimulated drive line D0 can capacitively cross-couple (illustrated by Cdd) with drive line D1 through the touching or hovering objects, and with other drive lines D2, D3 as well. For example, as the objects touch or hover over the panel 124 at stimulated pixels 126-a and 126-c, cross-coupling between the corresponding drive lines D0 and D2 can increase. Because of the negative pixel effect, the cross capacitance Cdd can be stronger than it would have been otherwise. The cross capacitance Cdd signals on the drive lines can be captured during a panel scan for processing by the sense circuitry.

Accordingly, during a panel scan, two capacitance measurements can be captured—cross capacitance Cdd, indicative of the negative pixel effect, and mutual capacitance Csig adjusted either by a proper touch or hover or by the negative pixel effect, indicative of a touch or hover at the panel—in essence, performing a touch scan and a negative pixel scan concurrently. The cross capacitance Cdd can be used to determine the negative pixel effect and to compensate the mutual capacitance Csig therefor. Various embodiments described below can measure Cdd and changes in Csig, determine the negative pixel effect from Cdd, and compensate Csig therefor.

Although various embodiments can be described and illustrated herein in terms of multi-touch, mutual capacitance touch panels, it should be understood that the various embodiments are not so limited, but can be additionally applicable to self capacitance panels and single stimulus touch panels. It should be further understood that the various embodiments are not limited to the drive and sense line configuration described and illustrated herein, but can include other configurations according to the needs of the touch panel.

Figure 2:
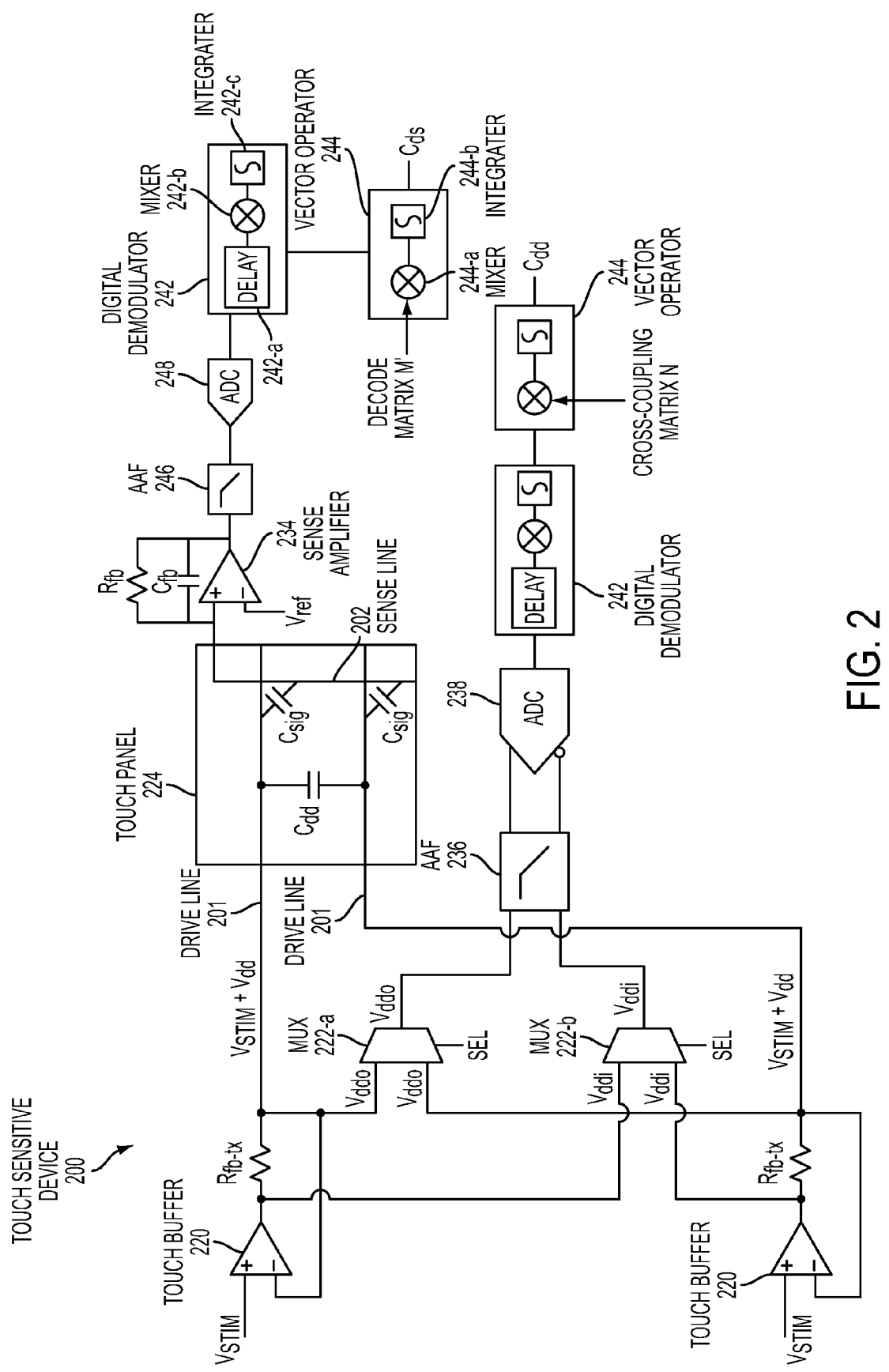
FIG. 2 illustrates an exemplary touch sensitive device that can perform a concurrent touch and negative pixel scan at a touch panel according to various embodiments.

FIG. 2 illustrates an exemplary touch sensitive device that can perform a concurrent touch and negative pixel scan of a touch panel according to various embodiments. In the example of FIG. 2, touch sensitive device 200 can include touch panel 224, drive circuitry, and sense circuitry. The drive circuitry can include touch buffers 220 coupled to drive lines 201 of the touch panel 224 to transmit stimulation signals Vstim to the panel to drive the panel. Vstim can be either a positive (+) phase stimulation signal Vstim+ or a negative (−) phase stimulation signal Vstim− having the same waveform as Vstim+ inverted about a common voltage. Each buffer 220 can transmit either Vstim+ or Vstim− based on the drive pattern of the device 200. In some embodiments, the drive pattern can be defined by a stimulus matrix M, which can include data to generate the stimulation signals, such as the phases of the stimulation signals for each drive line, which drive lines are stimulated concurrently, and so on. During a panel scan, scan logic (not shown) can use the stimulus matrix M data to control the drive pattern.

As stated previously, the drive lines 201 can capacitively cross-couple (illustrated by Cdd) with each other, either through the panel 224 or through objects touching or hovering over the drive lines. As illustrated in FIG. 2, the cross-coupling between two drive lines 201 can induce a voltage Vdd at the output of each touch buffer 220 of the coupled drive lines. As a result, each buffer 220 can output a composite signal that includes a stimulation signal Vstim and a drive coupling signal Vdd to drive the touch panel 224. Each buffer 220 can include a resistor Rfb_tx in a feedback loop of the buffer to sense the Vdd signal in preparation for negative pixel compensation based on the Vdd signal. The voltage drop across the resistor Rfb_tx, amounting to the Vdd signal, can be a function of the cross-coupling capacitance Cdd and can be defined as follows.

$$Vdd(n,m,s,t)=\omega_{STM} \cdot Rfb\_tx(n) \cdot Cdd(n,m) \cdot Vstim \cdot [M(n,s)-M(m,s)] \cdot \cos(\omega_{STM} t), \quad (1)$$

where Vdd(n,m,s,t)=voltage across Rfb_tx(n) due to coupling between touch buffer n and touch buffer m for panel scan step s, $\omega_{STM}$=stimulus frequency in radians, Rfb_tx(n) =feedback resistance of touch buffers n and m, Cdd(n,m) =coupling between touch buffers n and m, Vstim=amplitude of sinusoidal stimulation signal, M(n,s)=touch scan stimulus matrix M coefficient for touch buffer n and panel scan step s, and M(m,s)=touch scan stimulus matrix M coefficient for touch buffer m and panel scan step s. For a given touch buffer, a total of r·(r−1) coupling terms can be resolved, where r=total number of touch buffers.

To isolate the sensed Vdd signal, the drive circuitry can include multiplexers 222, differential anti-aliasing filter (AAF) 236, and differential analog-to-digital converter (ADC) 238. Multiplexer 222-a can receive the downstream resistor Vdd signals Vddo of the coupled buffers 220. Similarly, multiplexer 222-b can receive the upstream resistor Vdd signals Vddi of the coupled buffers 220. The multiplexers 222 can select one of the Vddo and Vddi signals based on selection signal SEL and can input the selected signals to the AAF 236 and the ADC 238. The ADC 238 can then output a digital signal proportional to the voltage drop across the resistor, i.e., the Vdd signal, in preparation for negative pixel compensation based on the Vdd signal. In these embodiments, the multiplexers 222 can allow sharing of the AAF 236 and ADC 238 between multiple touch buffers 220. In alternate embodiments, the multiplexers 222 can be omitted and each touch buffer 220 can have its own AAF 236 and ADC 238.

The sense circuitry can include sense amplifiers 234 coupled to sense lines 202 of the touch panel 224 to receive sense signals indicative of a change in Csig and a sensed touch or hover at the panel. In some embodiments, each sense line 202 can connect to a different sense amplifier 234.

In some embodiments, multiple sense lines 202 can share a sense amplifier 234, with a switch between the sense lines and the sense amplifier to sequentially connect each sense line to the amplifier. During a panel scan, scan logic (not shown) can control the sense circuitry for capturing and processing the sense signals.

The sense circuitry can also include AAF 246, ADC 248, digital demodulator 242, and vector operator 244 to process the sense signals. The AAF 246 can receive a sense signal from a sense amplifier 234 and low-pass filter the received signal. The ADC 248 can receive the filtered signal from the AAF 246 and convert the filtered signal to a digital signal. The digital demodulator 242 can receive a digital sense signal from the ADC 248 and use programmable delay 242-a to phase shift the sense signal so as to align the signal with a demodulation signal generated by a receive NCO (not shown) in order to maximize the demodulation gain, mixer 242-b to multiply the phase-shifted sense signal with the demodulation signal so as to demodulate the sense signal, and integrator 242-c to integrate the demodulated sense signal. The vector operator 244 can receive an integrated sense signal from the demodulator 242 and output touch panel pixel capacitances Cds, indicative of the coupling between drive and sense lines, using mixer 244-a to multiply the integrated signal with a decode matrix M' to decode the signal and using integrator 244-b to integrate the decoded sense signal, thereby obtaining the pixel capacitances. In some embodiments, the decode matrix M' can be the inverse of the stimulus matrix M. The decode matrix M' can include data for decoding the integrated sense signal. As described previously, the drive line cross-coupling can induce a Vdd signal into the panel 224. As a result, the outputted capacitances Cds from the vector operator 244 can include the cross-coupling capacitances Cdd and, hence, the negative pixel effect to be compensated for.

The digital demodulator 242 and the vector operator 244 can also be used to process the Vdd signals to output the cross-coupling capacitances Cdd, indicative of the negative pixel effect. The demodulator 242 can receive a Vdd signal from the differential ADC 238 and use the programmable delay 242-a, the mixer 242-b, and the integrator 242-c to process the Vdd signal, in the same manner as described previously regarding the sense signal. The vector operator 244 can receive an integrated Vdd signal from the demodulator 242 and, using a cross-coupling matrix N at the mixer 224-a, output drive line cross-coupling capacitances Cdd. In some embodiments, the cross-coupling matrix N can be the inverse of the stimulus matrix M. In other embodiments, the cross-coupling matrix N can be slightly different from the inverse of the stimulus matrix M, where the cross-coupling matrix N can include some data modifications, e.g., based on the stimulation signal Vstim phases between the cross-coupled drive lines. The cross-coupling matrix N can include data for decoding the integrated Vdd signal. During a panel scan, scan logic (not shown) can control the sense circuitry for capturing and processing the cross-coupling signals. An example multi-stimulus demodulation process is described in U.S. Patent Application No. 2010-0060593, "Phase Compensation for Multi-Stimulus Controller."

A processor (not shown) can receive the pixel capacitances Cds, indicative of the touch or hover sensing and including some indication of the drive line cross-coupling as well, and the drive line cross-coupling capacitances Cdd, indicative of the drive line cross-coupling. The processor can then apply the Cdd capacitances to the Cds capacitances, thereby compensating the touch and hover sensing for the negative pixel effect. An example negative pixel compensation process is described in U.S. Patent Application No. 2011-0006832, "Negative Pixel Compensation."

In an example panel scan of the touch sensitive device 200 of FIG. 2, stimulation signal Vstim+ can drive a drive line of the touch panel 224 and stimulation signal Vstim− can drive another drive line of the panel according to a drive pattern (based on stimulus matrix M) of the touch panel 224. As a poorly grounded object touches or hovers over the panel at pixel locations corresponding to the stimulated drive lines, the object can undesirably capacitively couple with the touch panel 224, thereby introducing charge back into the panel that shows up on the drive lines. In particular, the introduced charge can increase a cross-coupling between the drives lines, that shows up as cross-coupling signal Vdd. The Vstim+Vdd signals can drive the touch panel 224 to generate one group of sense signals, indicative of the touching or hovering object, that are attenuated by a negative capacitance, and another group of sense signals, at pixel locations where the object is not touching or hovering, that have negative pixel values, all due to the object's poor grounding. The sense signals and the cross-coupling signals can be captured and processed using the drive and sense circuitry, described above. Effectively, this can be a sense signal (or touch) scan and a cross-coupling signal (or negative pixel) scan performed concurrently.

It should be understood that the touch sensitive device is not limited to that shown in FIG. 2, but can include additional and/or other components for performing a concurrent touch and negative pixel scan according to various embodiments. It should further be understood that additional drive lines and associated drive circuitry and sense lines and associated sense circuitry can perform in the same manner as those illustrated in FIG. 2.

Figure 3A:
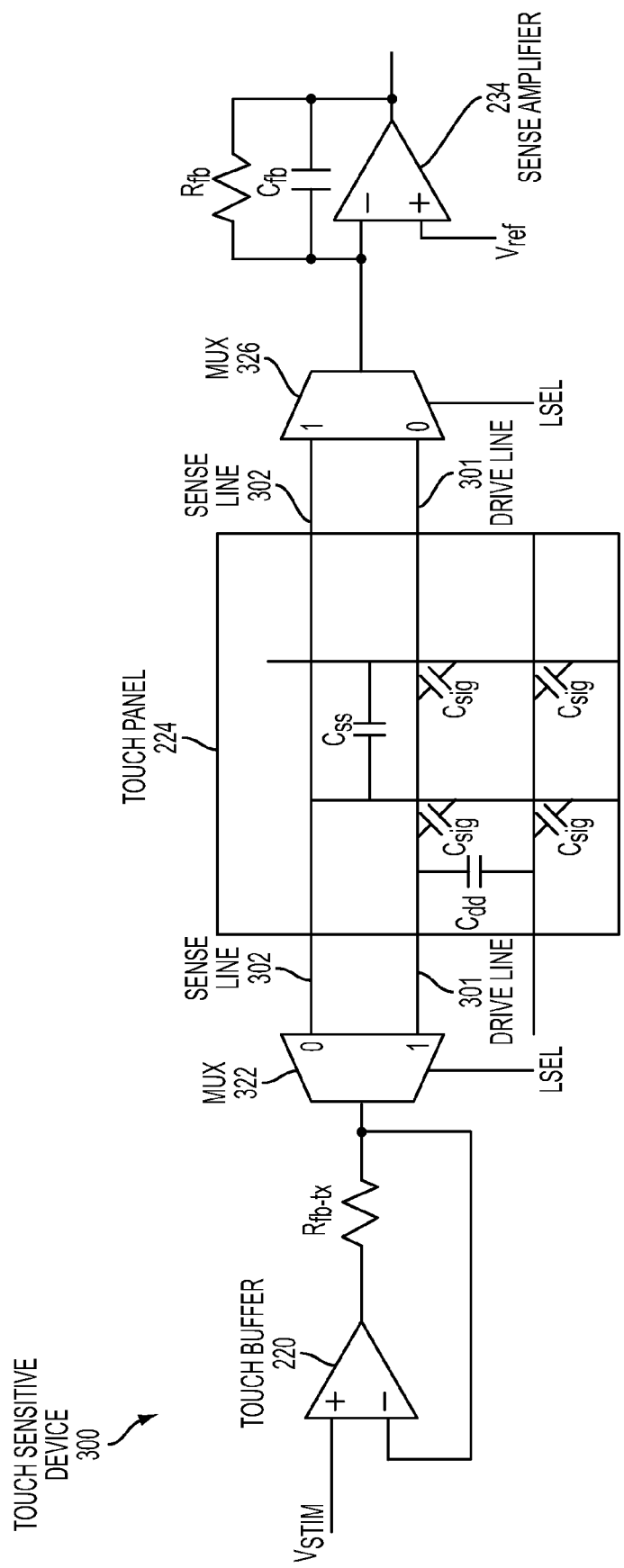
FIGS. 3A, 3B, and 3C illustrate an exemplary touch sensitive device that can switch touch panel configuration for a concurrent touch and negative pixel scan according to various embodiments.

FIG. 2 illustrates one drive-sense line configuration, where the drive lines can drive the touch panel 224 and capacitively cross-couple, while the sense lines transmit sense signals from the panel. In an alternate drive-sense line configuration, the sense lines can act as drive lines to drive the touch panel and capacitively cross-couple, while the drive lines act as sense lines to transmit sense signals from the panel. FIG. 3A illustrates switching circuitry that allows a touch sensitive device to switch between the two configurations. In some embodiments, the touch sensitive device can switch to a single configuration and perform the touch and negative pixel scan in that configuration, using that captured data for negative pixel compensation. In alternate embodiments, the touch sensitive device can switch between the two configurations and perform the touch and negative pixel scan in both configurations, using both sets of captured data for negative pixel compensation. The multiple scans can be performed during the same scan period or during different successive scan periods, based on the needs of the touch panel.

In the example of FIG. 3A, touch sensitive device 300 can be the same as touch sensitive device 200 of FIG. 2, except for the addition of multiplexers 322, 326. Multiplexer 322 can receive the output of touch buffer 220 and select, based on selection signal LSEL, whether to couple the output to drive line 301 or sense line 302 to drive the touch panel 224 and to sense line cross-coupling. Multiplexer 326 can output to sense amplifier 234 and select based on the selection signal LSEL whether to couple the drive line 301 or the sense line 302 to the amplifier in order to transmit sense signals from the touch panel 224 to the amplifier. For example, LSEL can select the drive lines 301 to drive the touch panel 224 and to sense drive line cross-coupling and the sense lines 302 to transmit sense signals from the panel (illustrated by LSEL logic 1). Conversely, LSEL can select the sense lines 302 to drive the touch panel 224 and to sense line cross-coupling and the drive lines 301 to transmit sense signals from the panel (illustrated by LSEL logic 0). Using these configurations, both drive line cross-coupling capacitances Cdd and sense line cross-coupling capacitances Css can be sensed and used to compensate for negative pixel effect.

When the sense lines 302 act as drive lines, either the same stimulus matrix M, decode matrix M', and/or cross-coupling matrix N, as for the drive lines, can be used or a different stimulus matrix M", decode matrix M''', and/or cross-coupling matrix N' can be used, based on the drive and sense line characteristics.

Figure 3B:
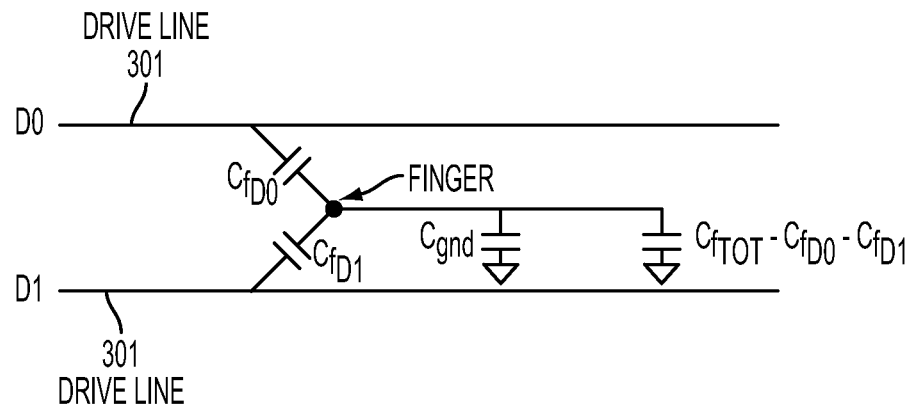

FIG. 3B illustrates exemplary components of drive line cross-coupling capacitance (illustrated by Cdd in FIG. 3A) when the drive lines 301 drive the touch panel 224 and an object, e.g., a finger, touches the panel. In the example of FIG. 3B, as a finger touches or hovers over the touch panel 224, several capacitances can form to make up the cross-coupling capacitance Cdd between stimulated drive lines 301, which can be defined as follows.

$$Cdd = C_{dd\_neg\_pix} + C_{dd\_mut} + \Delta C_{dd\_mut}, \quad (2)$$

where the cross-coupling capacitance due to the negative pixel effect $C_{dd\_neg\_pix}$ can be defined as $$C_{dd\_neg\_pix} = \frac{C_{fD0} + C_{fD1}}{C_{gnd} + C_{ftot}}, \quad (3)$$

where $C_{fD0}$=the coupling capacitance between the finger and drive line D0, $C_{fD1}$=the coupling capacitance between the finger and drive line D1, $C_{dd\_mut}$=the coupling capacitance between the drive lines D0, D1, $\Delta C_{dd\_mut}$=the variation in $C_{dd\_mut}$ due to the presence of the finger, $C_{gnd}=C_{body-earth}+C_{earth-chassis}$ (the sum of the capacitance between the object's, e.g., user's, body and the earth and the capacitance between the earth and the chassis of the device housing the touch panel), and $C_{ftot}$=the coupling capacitance of the finger to all the drive lines and sense lines.

Figure 3C:
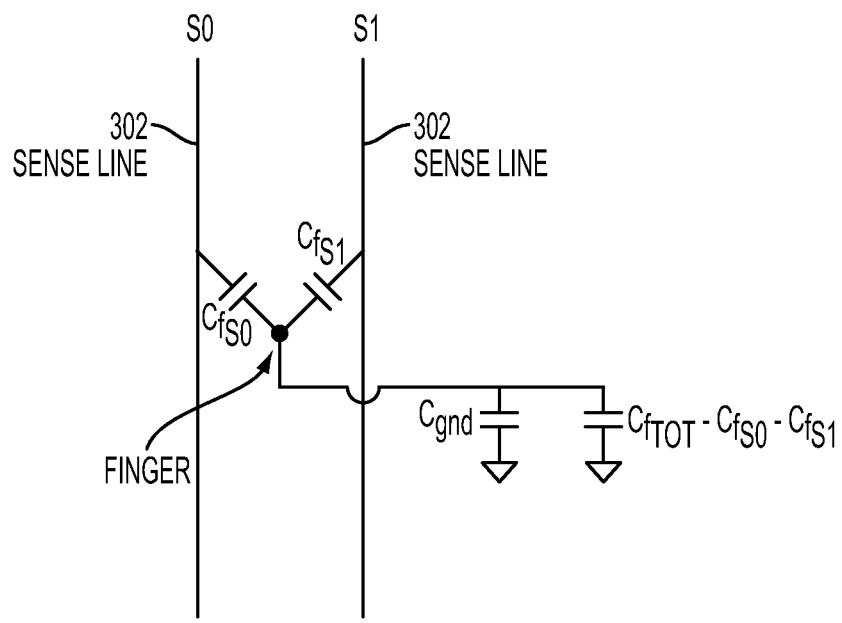

FIG. 3C similarly illustrates exemplary components of sense line cross-coupling capacitance (illustrated by Css in FIG. 3A) when the sense lines 302 drive the touch panel 224 and an object, e.g., a finger, touches the panel. In the example of FIG. 3C, as a finger touches or hovers over the touch panel 224, several capacitances can form to make up the cross-coupling capacitance Css between stimulated sense lines 302, which can be defined as follows.

$$Css = C_{ss\_neg\_pix} + C_{ss\_mut} + \Delta C_{ss\_mut}, \quad (4)$$

where the cross-coupling capacitance due to the negative pixel effect $C_{ss\_neg\_pix}$ can be defined as $$C_{ss\_neg\_pix} = \frac{C_{fS0} + C_{fS1}}{C_{gnd} + C_{ftot}}, \quad (5)$$

where $C_{fS0}$=the coupling capacitance between the finger and sense line S0, $C_{fS1}$=the coupling capacitance between the finger and sense line S1, $C_{ss\_mut}$=the coupling capacitance between the sense lines S0, S1, $\Delta C_{ss\_mut}$=the variation in $C_{ss\_mut}$ due to the presence of the finger, $C_{gnd}=C_{body-earth}+C_{earth-chassis}$ (the sum of the capacitance between the object's, e.g., user's, body and the earth and the capacitance between the earth and the chassis of the device housing the touch panel), and $C_{ftot}$=the coupling capacitance of the finger to all the drive lines and sense lines.

In addition to negative pixel effects on touch and hover sensing of the touch panel, noise introduced into the panel by adjacent circuitry can also be problematic. For example, a display, e.g., a liquid crystal display (LCD), adjacent to a touch panel in a touch sensitive display, can introduce noise into the panel when the LCD's Vcom layer undesirably capacitively couples with the panel. Accordingly, noise rejection circuitry can be used to reject the noise coupled from the LCD to the touch panel.

Figure 4:
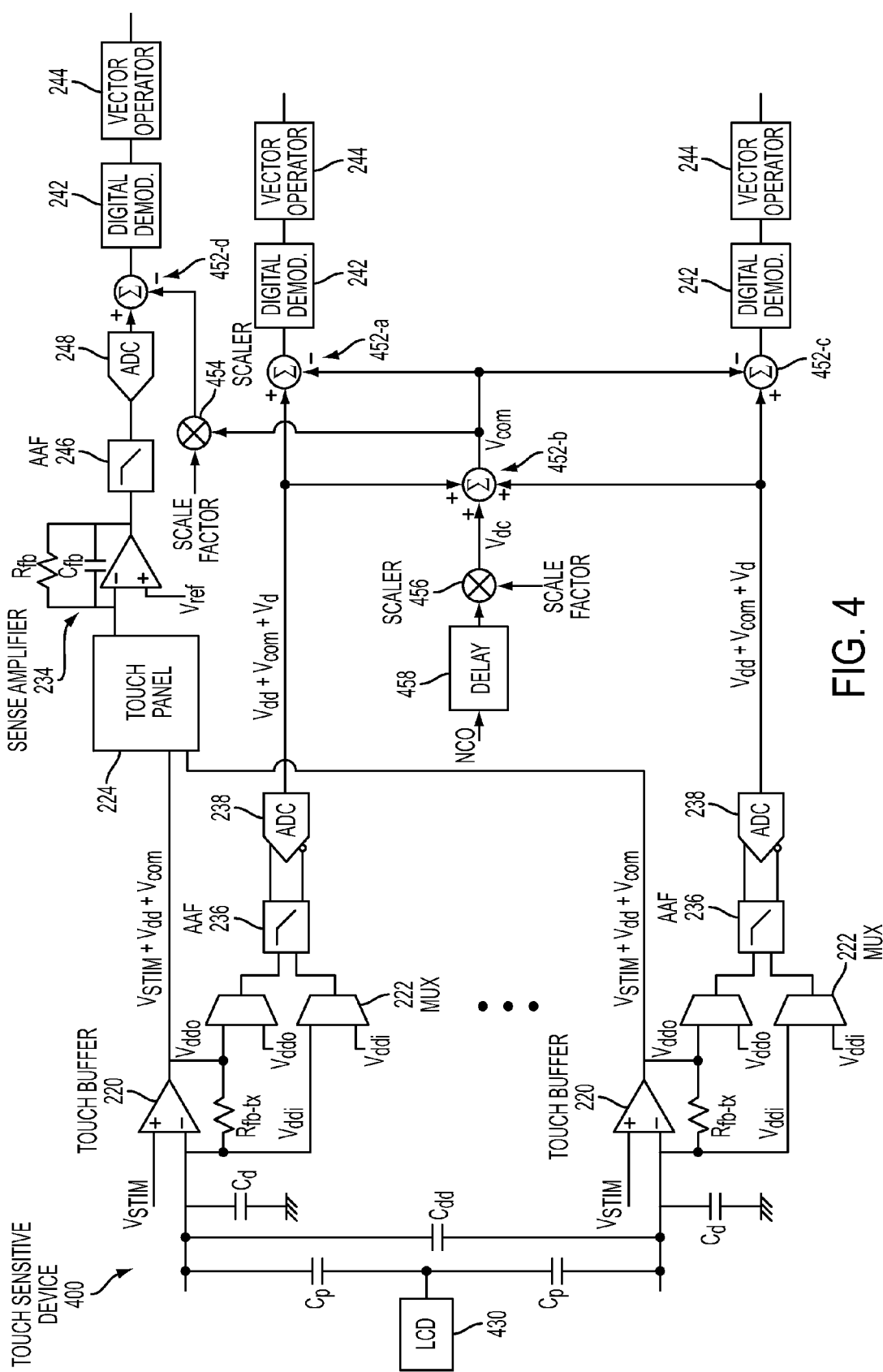
FIG. 4 illustrates an exemplary touch sensitive device that can perform noise rejection during a concurrent touch and negative pixel scan at a touch panel according to various embodiments.

FIG. 4 illustrates exemplary noise rejection circuitry that can be used to reject noise in a touch panel. In the example of FIG. 4, touch sensitive device 400 can be the same as touch sensitive device 200 of FIG. 2, except for the addition of noise rejection circuitry and an LCD. LCD 430 via its Vcom layer (not shown) can capacitive couple (illustrated by Cp) to the panel 224 via the touch buffers 220. As illustrated in FIG. 4, the voltage across the touch buffer resistor Rfb_tx can have three components, a Vdd signal induced by the cross-coupling between drive lines, a Vcom signal induced by the coupling between the LCD 430 and the touch panel 224, and a Vd signal corresponding to a load capacitance Cd driven with a sinusoidal stimulation signal Vstim by the touch buffer 220. The Vd signal can be defined as follows.

$$Vd(n,s,t)=\omega_{STM} \cdot Rfb\_tx \cdot Cd \cdot Vstim \cdot M(n,s) \cdot \cos(\omega_{STM} \cdot t), \quad (6)$$

where the Vd(n,s,t) signal across Rfb_tx can be caused by touch buffer n driving load capacitance Cd at a phase according to stimulus matrix M coefficient M(n,s) for buffer n and panel scan step s at frequency $\omega_{STM}$ (in radians). The Vdd+Vcom+Vd signal can be sensed and isolated through the multiplexors 222, AAF 236, and ADC 238, in a similar manner as described in FIG. 2 regarding the Vdd signal. The Vdd+Vcom+Vd signal can be outputted from the ADC 238 and inputted to the noise rejection circuitry.

The noise rejection circuitry can include summer 452-b to receive the Vdd+Vcom+Vd signals from the touch buffers 220. Across all the touch buffers 220, the number of positive phases and negative phases for the Vdd signals can be balanced because Vdd only occurs when the buffers that drive their corresponding cross-coupling capacitances Cdd are in opposite phase. As such, at summer 452-b, the Vdd signals can cancel each other out, leaving the Vd and Vcom signals.

To cancel out the Vd signals, a compensation signal Vdc can be added to summer 452-b to compensate for any imbalance between the number of positive phases and negative phases for the Vstim signals to the touch buffers 220. This is because the Vd signals are generated as a result of the Vstim signals and hence carry the same phase as their corresponding Vstim signals. For example, if there are 15 touch buffers and 9 are driven with Vstim+ and 6 are driven with Vstim−, there can be an imbalance of +3 (i.e., +9−6=+3) in the Vstim signals and hence in the Vd signals inputted to the summer 452-b. Accordingly, the compensation signal Vdc can be added to the summer 452-b to cancel the imbalance of +3. By doing so, the Vd signals can be canceled, leaving the Vcom signal.

To generate the compensation signal Vdc at an optimum phase and amplitude, the noise rejection circuitry can include programmable delay 458 to receive a Vstim signal from a transmit NCO (not shown) and to phase shift the Vstim signal to the optimum phase. The noise rejection circuitry can further include programmable scaler 456 to receive the phase-shifted Vstim signal and to adjust the amplitude of the signal using a programmable scale factor. The scaler 456 can then output to the summer 452-b the compensation signal Vdc at the optimum phase and amplitude to cancel out the Vd signals. The summer 452-b can then output the Vcom signal.

The noise rejection circuitry can include summers 452-a, 452-c to receive the Vcom signal from the summer 452-b and to subtract out the Vcom signal from the output of the ADC 238, i.e., the cross-coupling signals, thereby rejecting the noise introduced by the LCD 430. The noise rejection circuitry can also include programmable scaler 454 to scale the Vcom signal inputted from summer 452-b, using a programmable scale factor, in order to subtract the scaled Vcom signal from the sense signals. The noise rejection circuitry can include summer 452-d to received the scaled Vcom signal and to subtract the scaled Vcom signal from the sense signals, thereby rejecting the noise introduced by the LCD 430. The sense signals and the cross-coupling signals, with the noise rejected therefrom, can then be used in a similar manner as described previously to compensate the sense signals for negative pixel effects.

It is to be understood that the noise rejection circuitry is not limited to that of FIG. 4, but can include additional and/or other components and configurations according to various embodiments. It is further to be understood that noise is not limited to being introduced by an LCD, but can be introduced by any other circuitry adjacent to a touch panel.

Figure 5:
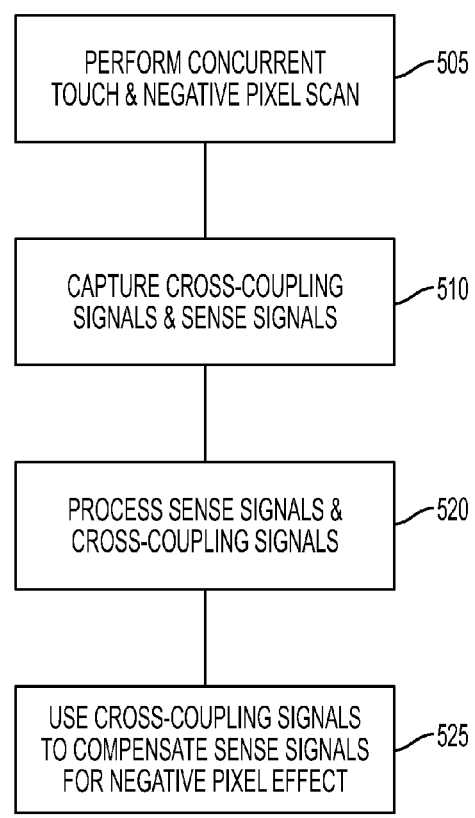
FIG. 5 illustrates an exemplary method for performing a concurrent touch and negative pixel scan at a touch panel according to various embodiments.

FIG. 5 illustrates an exemplary method for performing a concurrent touch and negative pixel scan at a touch panel according to various embodiments. In the example of FIG. 5, a scan of the touch panel can be performed to concurrently capture sense signals, indicative of a touching or hovering object at the panel, and cross-coupling signals, indicative of a negative pixel effect at the panel due to poor grounding of the object (505). During the scan, multiple stimulation signals can drive the panel along drive lines of the panel. The drive lines can capacitively cross-couple with each other to produce cross-coupling capacitances Cdd. The drive lines and sense lines of the panel can also capacitively couple to produce mutual capacitance Csig. As a poorly grounded object touches or hovers over the panel at multiple locations, the object can cause a negative pixel effect in the panel, which can be observed in the cross-coupling capacitances Cdd and the change in mutual capacitance Csig. Concurrently, the sense signals can be captured, representative of the change in Csig and the negative pixel effect, and the cross-coupling signals can be captured, representative of the negative pixel effect (510). The captured sense signals and cross-coupling signals can be processed (520). In some embodiments, the sense signals can be processed using decode matrix M' to obtain the pixel capacitances indicative of the touch or hover at the touch panel. Similarly, the cross-coupling signals can be processes using cross-coupling matrix N to obtain cross-coupling capacitances indicative of the negative pixel effect. The processed cross-coupling signals can be applied to the processed sense signals to compensate the sense signals for the negative pixel effect (525). In some embodiments, the cross-coupling signals can be subtracted from the sense signals to perform the compensation.

Figure 6:
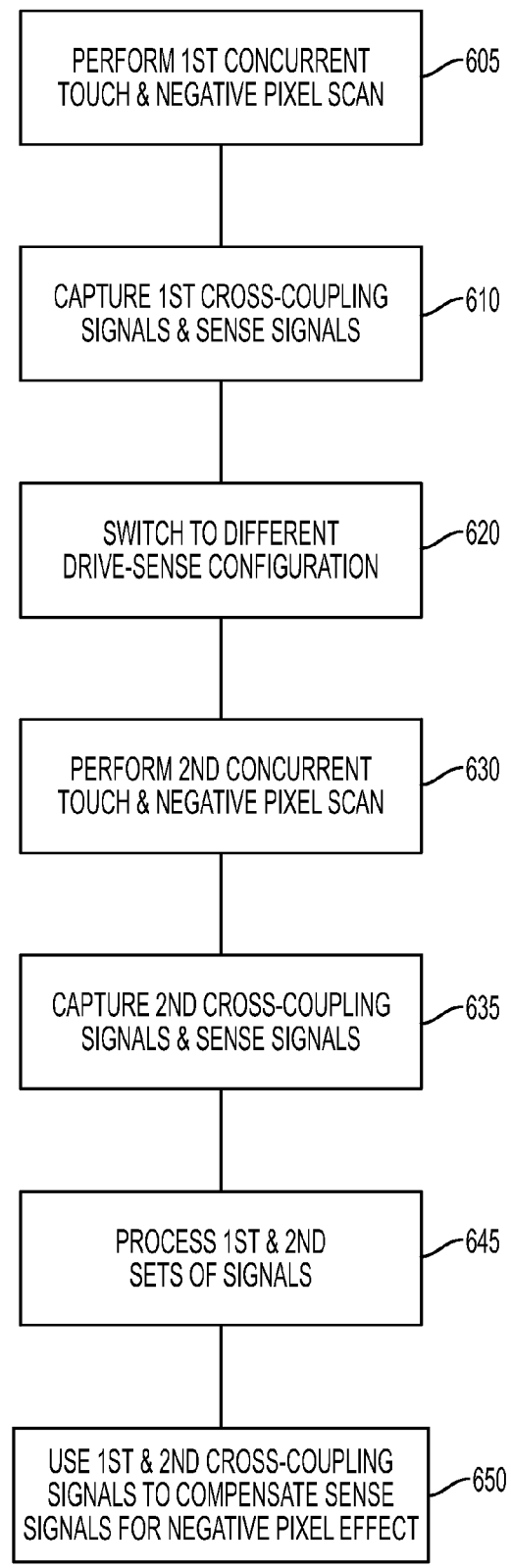
FIG. 6 illustrates another exemplary method for performing a concurrent touch and negative pixel scan at a touch panel according to various embodiments.

FIG. 6 illustrates another exemplary method for performing a concurrent touch and negative pixel scan at a touch panel according to various embodiments. In the example of FIG. 6, two scans can be performed, where the first scan is performed on the touch panel in a first drive-sense line configuration and the second scan is performed after switching the panel to a second drive-sense line configuration. In the first drive-sense configuration, the drive lines can drive the panel and capacitively cross-couple, while the sense lines transmit the sense signals for processing. This first scan can be the same as that described in FIG. 5. That is, a scan of the touch panel can be performed to concurrently capture sense signals, indicative of a touching or hovering object at the panel, and cross-coupling signals, indicative of a negative pixel effect at the panel due to poor grounding of the object (605). During the scan, multiple stimulation signals can drive the panel along drive lines of the panel. The drive lines can capacitively cross-couple with each other to produce cross-coupling capacitances Cdd. The drive lines and sense lines of the panel can also capacitively couple to produce mutual capacitance Csig. As a poorly grounded object touches or hovers over the panel at multiple locations, the object can cause a negative pixel effect in the panel, which can be observed in the cross-coupling capacitances Cdd and the change in mutual capacitance Csig. Concurrently, the sense signals can be captured, representative of the change in Csig and the negative pixel effect, and the cross-coupling signals can also be captured, representative of the negative pixel effect (610).

The touch panel can be switched to the second drive-sense configuration, in which the sense lines can act as drive lines to drive the panel and capacitively cross-couple, while the drive lines act as sense lines to transmit the sense signals for processing (620). A second scan of the touch panel can be performed (630). During this scan, multiple stimulation signals can drive the panel along sense lines of the panel. The sense lines can capacitively cross-couple with each other to produce cross-coupling capacitances Css. The sense and drive lines can capacitively couple to produce mutual capacitance Csig. While the poorly grounded object continues to touch or hover over the panel at multiple locations, the negative pixel effect can be observed in the cross-coupling capacitances Css and the change in mutual capacitance Csig. Concurrently, the sense signals on the drive lines can be captured, representative of the change in Csig and the negative pixel effect, and the cross-coupling signals at the sense lines can be captured, representative of the negative pixel effect (635). Both captured sets of sense and cross-coupling signals can be processed (645). In some embodiments, the first set of sense signals can be processed using decode matrix M' to obtain the pixel capacitances indicative of the touch or hover at the touch panel. The second set of sense signals can be similarly processed using either decode matrix M' or M'". Similarly, the first set of cross-coupling signals can be processed using cross-coupling matrix N to obtain cross-coupling capacitances indicative of the negative pixel effect. The second set of cross-coupling signals can be processed using cross-coupling matrix N or N'.

Both sets of processed cross-coupling signals and processed sense signals can be used to compensate the sense signals for the negative pixel effect (650). In some embodiments, the corresponding pairs of cross-coupling signals can be averaged (or otherwise combined) and the corresponding pairs of sense signals can be averaged (or otherwise combined) and the cross-coupling average signal can be applied to the corresponding sense signal average to compensate for negative pixel effect. In alternate embodiments, the cross-coupling signals in the first drive-sense line configuration can be applied to the corresponding sense signals to get a first set of compensated sense signals and, similarly, the cross-coupling signals in the second drive-sense line configuration can be applied to the corresponding sense signals to get a second set of compensated sense signals. The sets of compensated sense signals can then be averaged (or otherwise combined). Applying the cross-coupling signal to the sense signal can involve subtracting the cross-coupling signal from the sense signal.

Figure 7:
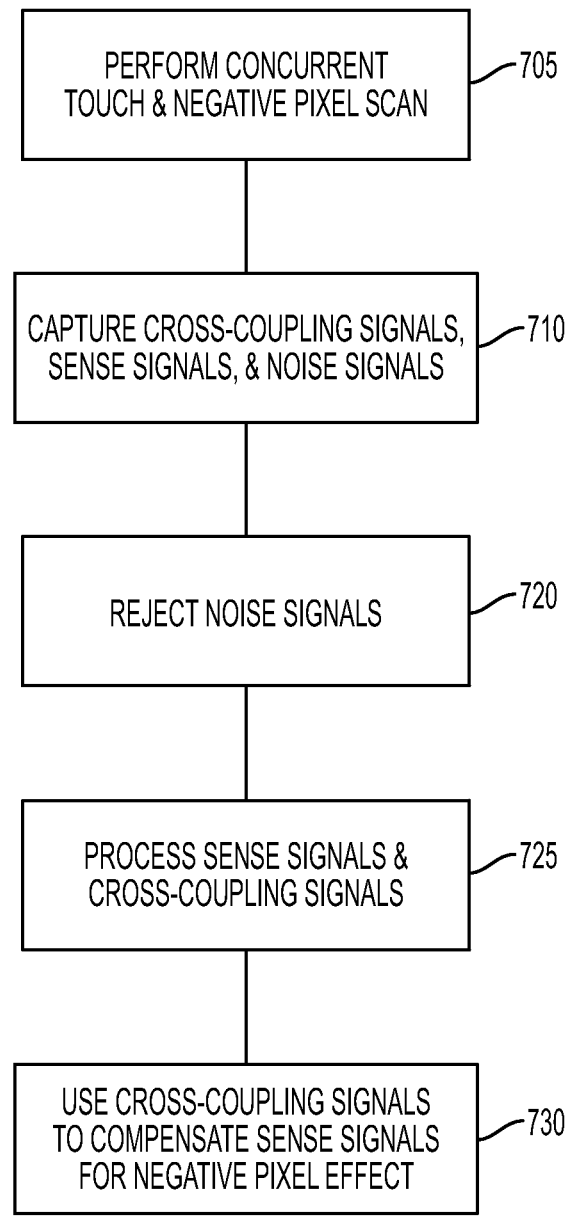
FIG. 7 illustrates an exemplary method for performing a concurrent touch and negative pixel scan at a touch panel and for rejecting noise in the panel according to various embodiments.

FIG. 7 illustrates an exemplary method for performing a concurrent touch and negative pixel scan and for rejecting noise at a touch panel according to various embodiments. The method of FIG. 7 can be the same as the method of FIG. 5, except for the addition of noise rejection. In the example of FIG. 7, a scan can be performed (705). During the scan, the drive lines can capacitively cross-couple to produce cross-coupling capacitances Cdd and the drive and sense lines can capacitive couple to produce mutual capacitances Csig, as described previously. Additionally, circuitry adjacent to the touch panel, e.g., LCD Vcom circuitry, can capacitively couple with the touch panel to produce coupling capacitances Cp, thereby inducing noise in the touch panel. Concurrently, the sense signals can be captured, representative of the change in Csig and the negative pixel effect, and the cross-coupling signals, which can include the noise signals, can be captured, representative of the negative pixel effect and the introduced noise (710). The noise can be rejected from the cross-coupling signals and the sense signals (720). The sense signals and the cross-coupling signals can be further processed (725). The processed cross-coupling signals can be applied to the processed sense signals to compensate the sense signals for the negative pixel effect (730). In some embodiments, the cross-coupling signals can be subtracted from the sense signals to perform the compensation.

It is to be understood that concurrent scanning is not limited to the methods of FIGS. 5-7, but can include additional and/or other actions according to various embodiments.

Figure 8:
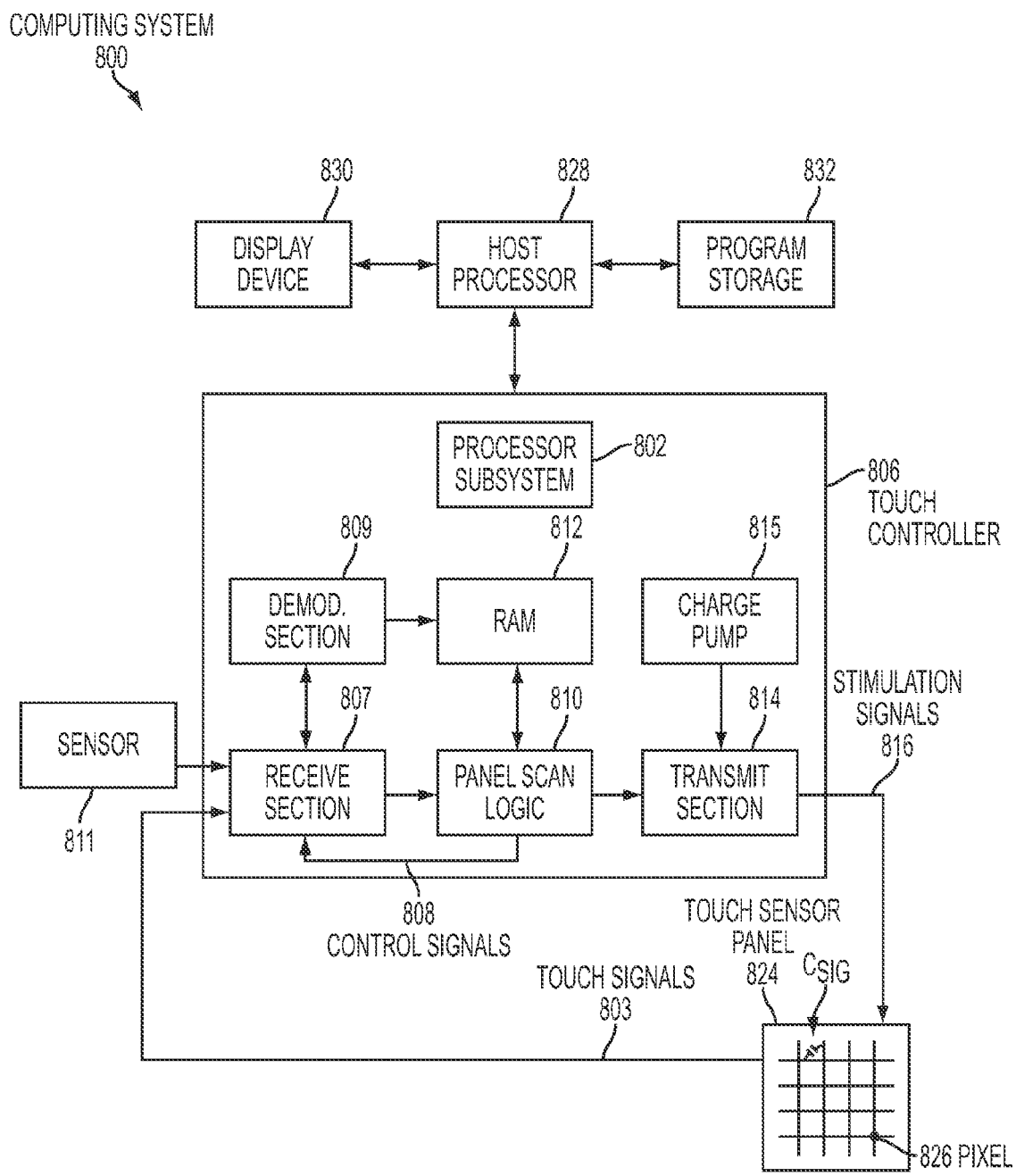
FIG. 8 illustrates an exemplary computing system that can perform a concurrent touch and negative pixel scan at the system's touch panel according to various embodiments.

FIG. 8 illustrates an exemplary computing system 800 that can perform a concurrent touch and negative pixel scan at the system touch panel according to various embodiments described herein. In the example of FIG. 8, computing system 800 can include touch controller 806. The touch controller 806 can be a single application specific integrated circuit (ASIC) that can include one or more processor subsystems 802, which can include one or more main processors, such as ARM968 processors or other processors with similar functionality and capabilities. However, in other embodiments, the processor functionality can be implemented instead by dedicated logic, such as a state machine. The processor subsystems 802 can also include peripherals (not shown) such as random access memory (RAM) or other types of memory or storage, watchdog timers and the like.

The touch controller 806 can also include receive section 807 for receiving signals, such as touch signals 803 of one or more touch sense channels (not shown) and other signals from other sensors such as sensor 811, etc. The touch controller 806 can also include demodulation section 809 such as a multistage vector demodulation engine, panel scan logic 810, and transmit section 814 for transmitting stimulation signals 816 to touch sensor panel 824 to drive the panel and to force sensor bridge 836 to drive the bridge. The panel scan logic 810 can access RAM 812, autonomously read data from the sense channels, and provide control for the sense channels. In addition, the panel scan logic 810 can control the transmit section 814 to generate the stimulation signals 816 at various frequencies and phases that can be selectively applied to rows of the touch sensor panel 824.

The touch controller 806 can also include charge pump 815, which can be used to generate the supply voltage for the transmit section 814. The stimulation signals 816 can have amplitudes higher than the maximum voltage by cascading two charge store devices, e.g., capacitors, together to form the charge pump 815. Therefore, the stimulus voltage can be higher (e.g., 6V) than the voltage level a single capacitor can handle (e.g., 3.6 V). Although FIG. 8 shows the charge pump 815 separate from the transmit section 814, the charge pump can be part of the transmit section.

Computing system 800 can also include touch sensor panel 824, which can be as described above in FIG. 1, and display device 830.

Computing system 800 can include host processor 828 for receiving outputs from the processor subsystems 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 828 can also perform additional functions that may not be related to panel processing, and can be coupled to program storage 832 and display device 830 for providing a UI to a user of the device. In some embodiments, the host processor 828 can be a separate component from the touch controller 806, as shown. In other embodiments, the host processor 828 can be included as part of the touch controller 806. In still other embodiments, the functions of the host processor 828 can be performed by the processor subsystem 802 and/or distributed among other components of the touch controller 806. The display device 830 together with the touch sensor panel 824, when located partially or entirely under the touch sensor panel or when integrated with the touch sensor panel, can form a touch sensitive display.

Note that one or more of the functions described above, can be performed, for example, by firmware stored in memory (e.g., one of the peripherals) and executed by the processor subsystem 802, or stored in the program storage 832 and executed by the host processor 828. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system is not limited to the components and configuration of FIG. 8, but can include other and/or additional components in various configurations capable of a concurrent touch panel scan according to various embodiments.

Figure 9:
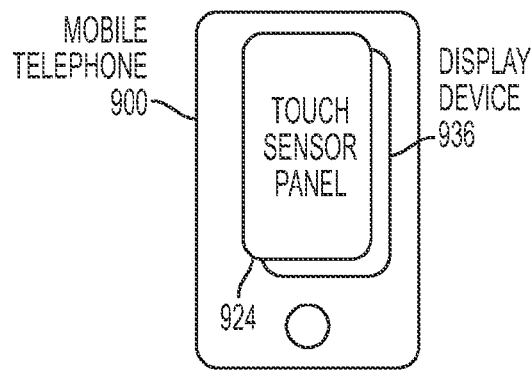
FIG. 9 illustrates an exemplary mobile telephone that can perform a concurrent touch and negative pixel scan at the telephone's touch panel according to various embodiments.

FIG. 9 illustrates an exemplary mobile telephone 900 that can include touch panel 924, display device 936, and other computing system blocks, and can perform a concurrent touch and negative pixel scan on the touch panel, according to various embodiments.

Figure 10:
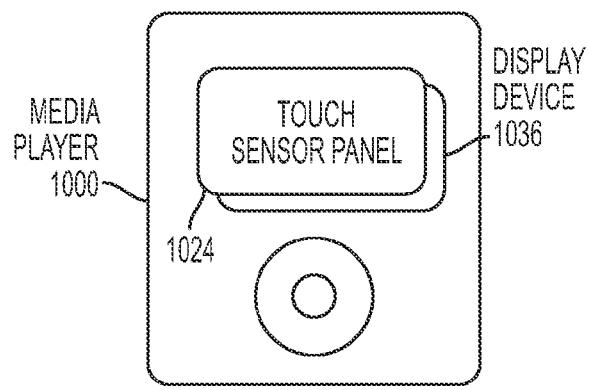
FIG. 10 illustrates an exemplary digital media player that can perform a concurrent touch and negative pixel scan at the player's touch panel according to various embodiments.

FIG. 10 illustrates an exemplary digital media player 1000 that can include touch panel 1024, display device 1036, and other computing system blocks, and can perform a concurrent touch and negative pixel scan on the touch panel, according to various embodiments.

Figure 11:
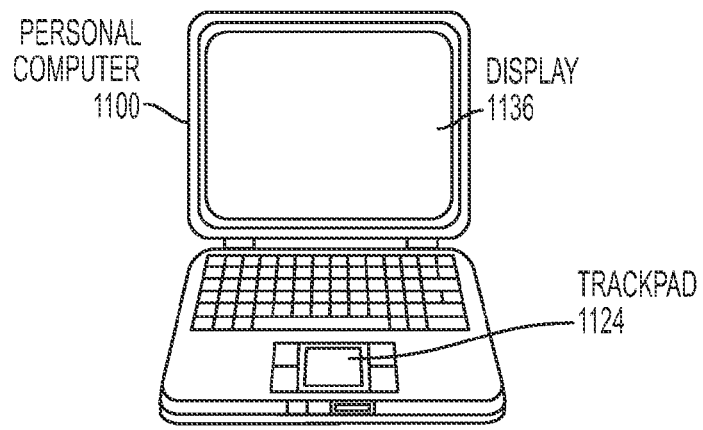
FIG. 11 illustrates an exemplary portable computer that can perform a concurrent touch and negative pixel scan at the computer's touch panel according to various embodiments.

FIG. 11 illustrates an exemplary personal computer 1100 that can include touch pad 1124, display 1136, and other computing system blocks, and can perform a concurrent touch and negative pixel scan on the touch panel, according to various embodiments.

The mobile telephone, media player, and personal computer of FIGS. 9 through 11 can provide power and processing time savings and improved touch and hover sensing, especially for multiple simultaneous touch or hover events, by performing a concurrent touch and negative pixel scan at the touch panel so as to compensate for negative pixel effect according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for performing a scan at a touch panel, wherein the touch panel comprises a first set of conductive lines and a second set of conductive lines, the method comprising:
    performing a first scan at the touch panel, the touch panel being in a first configuration wherein the first set of conductive lines are configured as drive lines and the second set of conductive lines are configured as sense lines;
    during the first scan, capturing a first set of first signals indicating a touch at the touch panel and a first set of second signals indicating a negative pixel effect at the touch panel;
    switching the touch panel from the first configuration to a second configuration;

performing a second scan at the touch panel, the touch panel being in the second configuration wherein the second set of conductive lines are configured as drive lines and the first set of conductive lines are configured as sense lines;

during the second scan, capturing a second set of first signals indicating the touch at the touch panel and a second set of second signals indicating the negative pixel effect at the touch panel; and generating a modified touch signal based on the first and second set of first signals and the first and second set of second signals to compensate for the negative pixel effect.

2. The method of claim 1, wherein performing the first scan comprises:

stimulating the touch panel to sense a proximate object;

generating first signals indicative of a proximity of the object; and generating second signals indicative of a negative pixel effect at the touch panel based on a grounding condition of the proximate object.

3. The method of claim 1, wherein the first set of conductive lines cross the second set of conductive lines, and the switching comprises:

switching from the first configuration, in which the first set of conductive lines act as drive lines to stimulate the touch panel to sense a proximate object and to cross-couple so as to generate second signals indicative of a negative pixel effect at the touch panel and in which the second set of conductive lines act as sense lines to generate first signals indicative of a proximity of the object, to the second configuration, in which the second set of conductive lines act as the drive lines and the first set of conductive lines act as the sense lines.

4. The method of claim 1, wherein performing the second scan comprises:

stimulating the touch panel to sense a proximate object;

generating first signals indicative of a proximity of the object; and generating second signals indicative of a negative pixel effect at the touch panel based on a grounding condition of the proximate object.

5. The method of claim 1, comprising:

compensating for the negative pixel effect, the compensating including combining the first and second sets of first signals to form combined first signals, combining the first and second sets of second signals to form combined second signals, and subtracting the combined second signals from the combined first signals to compensate for the negative pixel effect.

6. The method of claim 1 comprising:

compensating for the negative pixel effect, the compensating including combining the first and second sets of first signals to form combined first signals, combining the first and second sets of second signals to form combined second signals, and applying the combined second signals to the combined first signals to compensate for the negative pixel effect.

7. A touch sensor panel comprising:

a first set of conductive lines;

a second set of conductive lines;

switching circuitry configured to:

switch the touch panel into a first configuration wherein the first set of conductive lines are configured as drive lines and the second set of conductive lines are configured as sense lines; and switch the touch panel into a second configuration wherein the second set of conductive lines are configured as drive lines and the first set of conductive lines are configured as sense lines; and scan circuitry configured to:

perform a first scan at the touch panel in the first configuration;

during the first scan, capturing a first set of first signals indicating a touch at the touch panel and a first set of second signals indicating a negative pixel effect at the touch panel;

perform a second scan at the touch panel in the second configuration;

during the second scan, capturing a second set of first signals indicating the touch at the touch panel and a second set of second signals indicating the negative pixel effect at the touch panel; and generating a modified touch signal based on the first and second set of first signals and the first and second set of second signals to compensate for the negative pixel effect.

8. The touch sensor panel of claim 7, wherein performing the first scan comprises:

stimulating the touch panel to sense a proximate object;

generating first signals indicative of a proximity of the object; and generating second signals indicative of a negative pixel effect at the touch panel based on a grounding condition of the proximate object.

9. The touch sensor panel of claim 7, wherein the first set of conductive lines cross the second set of conductive lines, and the switching by the switching circuitry comprises:

switching from the first configuration, in which the first set of conductive lines act as drive lines to stimulate the touch panel to sense a proximate object and to cross-couple so as to generate second signals indicative of a negative pixel effect at the touch panel and in which the second set of conductive lines act as sense lines to generate first signals indicative of a proximity of the object, to the second configuration, in which the second set of conductive lines act as the drive lines and the first set of conductive lines act as the sense lines.

10. The touch sensor panel of claim 7, wherein performing the second scan comprises:

stimulating the touch panel to sense a proximate object;

generating first signals indicative of a proximity of the object; and generating second signals indicative of a negative pixel effect at the touch panel based on a grounding condition of the proximate object.

11. The touch sensor panel of claim 7, comprising:

negative pixel circuitry configured to:

compensate for the negative pixel effect, the compensating including:

combining the first and second sets of first signals to form combined first signals, combining the first and second sets of second signals to form combined second signals, and subtracting the combined second signals from the combined first signals to compensate for the negative pixel effect.

12. The touch sensor panel of claim 7, wherein the switching circuitry is further configured to:

compensate for the negative pixel effect, the compensating including
   combining the first and second sets of first signals to form combined first signals,
   combining the first and second sets of second signals to form combined second signals, and
   applying the combined second signals to the combined first signals to compensate for the negative pixel effect.

* * * * *